United States Patent
Rudd

[15] 3,681,985
[45] Aug. 8, 1972

[54] LIQUID FLOW METER

[72] Inventor: Neilson Rudd, Mt. Vernon, Ill.

[73] Assignee: Geo-Engineering Laboratories, Inc., Mt. Vernon, Ill.

[22] Filed: Nov. 9, 1970

[21] Appl. No.: 87,989

[52] U.S. Cl. .............................................. 73/194 E
[51] Int. Cl. ............................................... G01f 1/00
[58] Field of Search ............................... 73/194, 224

[56] References Cited

UNITED STATES PATENTS

| | | | |
|---|---|---|---|
| 2,683,986 | 7/1954 | Bartlett | 73/194 |
| 2,333,791 | 11/1943 | Hutchison, Jr. | 73/194 |
| 2,135,302 | 11/1938 | Everson | 73/194 |
| 3,350,937 | 11/1967 | Brewer | 73/224 |
| 3,107,818 | 10/1963 | Carmellini | 222/50 |

*Primary Examiner*—Richard C. Queisser
*Assistant Examiner*—Herbert Goldstein
*Attorney*—Koenig, Senniger, Powers and Leavitt

[57] ABSTRACT

A liquid flow meter for measuring extremely low flow rates, in which the rate of flow of a liquid is measured by having the flow occur in discrete droplets from a droplet-forming tube into a column of mercury, the formation of a droplet causing the column of mercury to rise and interrupt a beam of light to a photocell for actuating a counter to totalize the number of droplets.

7 Claims, 4 Drawing Figures

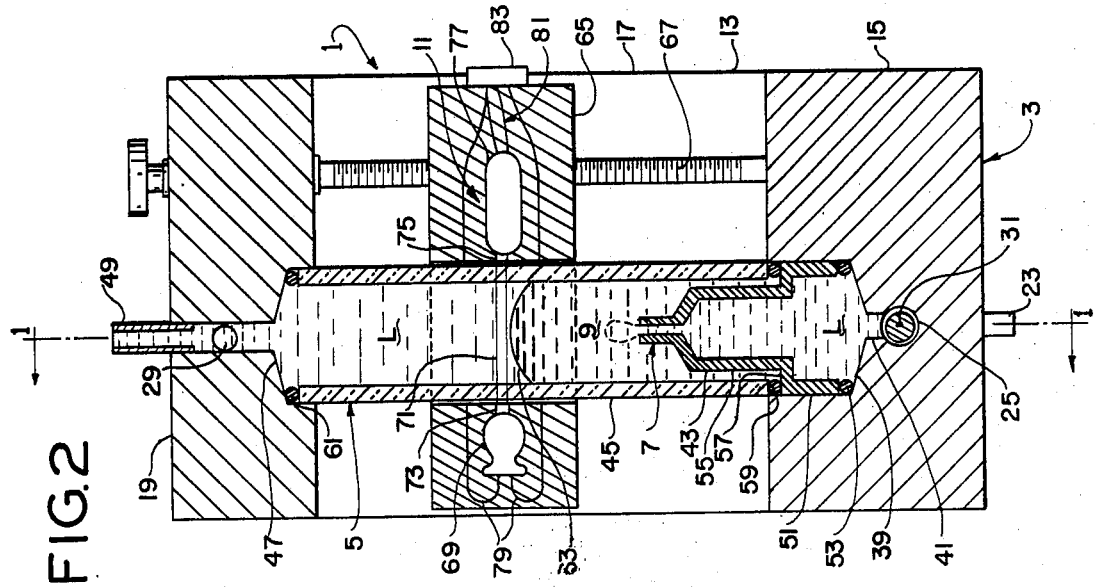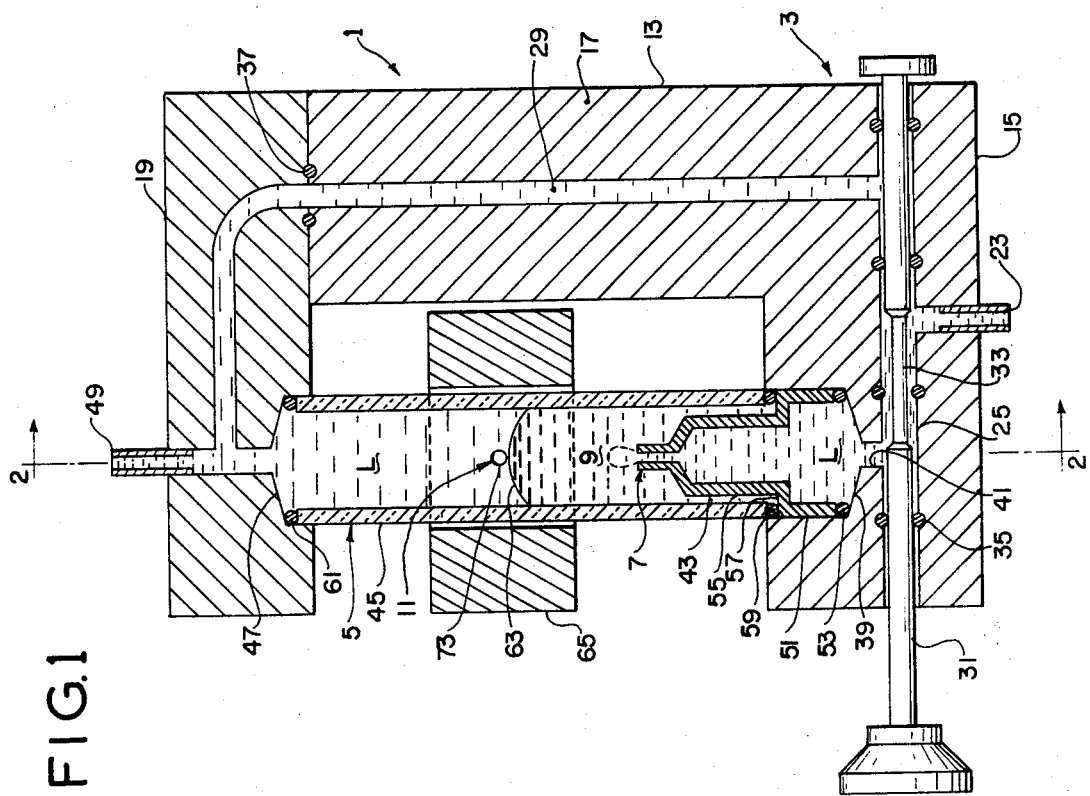

LIQUID FLOW METER

BACKGROUND OF THE INVENTION

This invention relates to liquid flow meters, and more particularly to a meter of this class for measuring extremely low flow rates over long periods of time.

The invention is especially concerned with a low-rate liquid flow meter of a type in which metering is gasoline) by causing the flow of the liquid to be measured to occur in droplets or bubbles in another liquid and counting the droplets. Reference may be made to U.S. Pat. No. 2,333,791 showing a meter of this general class. This prior device, however, forms globules of the liquid, the flow of which is to be metered (e.g., gasoline in a transparent liquid (e.g., glycerine) and counts the globules via their interception of a beam of light directed through the transparent liquid to a photocell. This type of device inherently has problems re globule size and is of limited application due to the miscibility of many liquids, the flow rate of which it may be desired to meter,with the transparent liquid, and due to the light-transmission characteristics of many liquids, the flow rate of which it may be desired to meter.

SUMMARY OF THE INVENTION

Among the several objects of this invention may be noted the provision of an improved liquid flow meter capable of measuring extremely low flow rates by counting droplets of extremely small and substantially uniform size; the provision of such a meter capable of measuring extremely low flow rates of a wide variety of liquids; and the provision of such a meter which, while being quite sensitive, is reliable and long-lasting in service.

In general, a meter of this invention comprises a body having a passage for flow of liquid therethrough and means in this passage for causing the flow to occur upward in droplets. Above the droplet forming means, the passage holds a volume of mercury, and means is provided controlled by the mercury for detecting each droplet. More particularly, the mercury is contained in a transparent tube, and the droplet detection is by interruption of a beam of light to a photoelectric cell by the mercury upon a rise in its level caused by formation of a droplet. Other objects and features will be in part apparent and in part pointed out hereinafter.

BRIEF DESCRIPTION OF THE DRAWINGS

FIG. 1 is a vertical section of a meter of this invention on line 1—1 of FIG. 2;

FIG. 2 is a vertical section on line 2—2 of FIG. 1;

Corresponding reference characters indicate corresponding parts throughout the several views of the drawings.

DESCRIPTION OF THE PREFERRED EMBODIMENT

Figure 3:
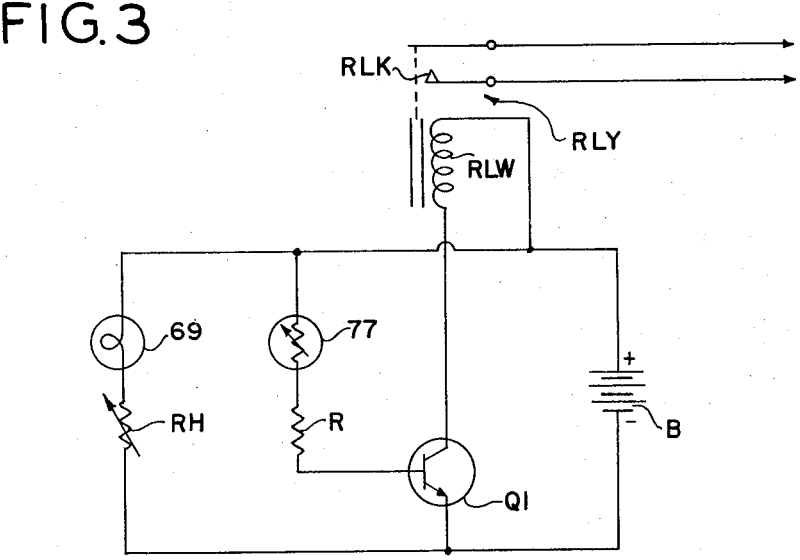
FIG. 3 is a diagram of certain electronic circuitry of the meter.

Referring to FIGS. 1 and 2 of the drawings, there is generally indicated at 1 a liquid flow meter of this invention capable of measuring extremely low flow rates of a liquid indicated at L, and hence also being referred to as a microflow meter. As shown, the meter comprises a body 3 having a passage generally designated 5 for flow of the liquid L therethrough. At 7 is generally indicated means in the passage 5 for causing the flow of liquid to occur upward in droplets D through a volume of mercury 9 in the passage above the droplet-forming means 7. At 11 is generally indicated means controlled by the mercury for detecting each droplet.

The body 3 comprises an L-shaped member 13 having a horizontal base 15 and a vertical leg 17 extending up from the base at one end thereof, and a separate head 19 secured at one end on the upper end of leg 17 and extending above the base. Liquid L is adapted to enter the passage 5 via an inlet 23 in the bottom of the base and a horizontal valve passage 25 in the base under control of a valve slidable in the valve passage. The passage 5 constitutes a flow metering path for the liquid, which may also be diverted through a by-pass passage 29 in the body 3 around passage 5. The valve is designated 31, and is constituted by a plunger axially slidable in the horizontal valve passage 25 having an annular groove 33 so located and of such width as to establish communication from inlet 23 to flow metering passage 5 when the plunger is moved to its left-hand position shown in FIG. 1; to cut off passage 5 and establish communication from inlet 23 to by-pass passage 29 when the plunger is moved to a right-hand position. The plunger cuts off both passages 5 and 29 when moved to an intermediate position. Seals are provided in the valve passage as indicated at 35, and a seal 37 is provided around the by-pass passage between the head 19 and the upper end of leg 17.

The flow metering passage 5 is established by a recess 39 in the top of the base 15 in communication with the horizontal valve passage 25 via a port 41, a tubular fitting 43 having its lower end socketed in the recess 39, and a tube 45 made of glass or other suitable transparent material extending upwardly from the base 15 with its upper end socketed in a recess 47 in the bottom of the head 19. An outlet port 49 extends up from recess 47 to the top of the head. The by-pass passage 29 extends from the valve passage 25 adjacent its right end as viewed in FIG. 1 to the outlet port.

The fitting 43 has a cylindrical lower end portion 51 fitting in the recess 39 with a seal at 53, an intermediate diameter intermediate portion 55 extending up from the lower end portion with an upwardly facing annular shoulder 57 around the lower end of portion 55, and a small diameter tube constituting the droplet-forming means 7 extending up from the upper end of portion 55. The lower end of the glass tube fits around the intermediate portion 55 of the fitting 43 and engages a seal 59 on the shoulder 57. A seal 61 is provided at the upper end of the glass tube. The mercury 9 is contained in the glass tube, its volume being such that it extends above the tip of the droplet-forming tube 7 but insufficient for the head of mercury above the tip of tube 7 to exert sufficient pressure to overcome surface tension and force mercury down into the tube 7. In this regard, it is generally desirable to have the tip of the tube 7 covered by at least 2 to 3 millimeters of mercury. The top or meniscus of the column of mercury in the glass tube is designated 63.

The means 11 controlled by the mercury for detecting each droplet of liquid L formed in the mercury at the upper end of tube 7 comprises a sensing head 65 surrounding the glass tube 45 and threaded on a vertically extending adjustment screw 67 so that the sensing head may be vertically moved along the tube 45. The sensing head contains a light source 69 that emits a horizontal beam of light, generally indicated at 71, perpendicular to the glass tube 45 via an aperture 73. The light beam is perpendicularly directed through the tube 45 to pass through a second aperture 75 in the sensing head on the opposite side of the tube 45. A photoelectric cell 77, and more particularly one whose electrical resistance is sensitive to changes in light impinging thereon, such as a silicon photodiode 77, is located within the sensing head directly behind the second aperture 75 for sensing the beam of light. Electrical connections 79 are made to the light source 69 and electrical connections 81 are made with the photodiode 77 via a multi-contact terminal 83 on the head 65.

In accordance with this invention, circuitry is provided which is responsive to changes in the resistance of photodiode 77 for operation of a counting device to totalize the number of droplets detected by the droplet detecting means. Referring to FIG. 3, the light source 69 (an incandescent light bulb) is connected in a series circuit including a rheostat RH across a battery B, which may be a 6-volt cell. Rheostat RH is provided to permit adjustment of the intensity of bulb 69. The winding RLW of a relay, indicated generally RLY, is connected in another series circuit including the collector and emitter terminals of an NPN transistor Q1 across battery B. Photocell 77 is series-connected with a current-limiting resistor R between one side of the battery, i.e., the positive terminal, and the base terminal of transistor Q so that the latter is normally conductive when light impinges on photocell 77 but becomes nonconductive in the absence of light on photocell 77. Relay RLY has a pair of normally open contacts RLK connected in a circuit with a suitable counter. As long as light from bulb 69 impinges on photodiode 77, transistor Q is conductive thereby energizing relay winding RLW to close contacts RLK. However, when the beam of light between bulb 69 and photodiode 77 is interrupted (by rise in the mercury level caused by formation of a droplet), transistor Q becomes nonconductive and relay contacts RLK open. When the droplet rises and escapes from the mercury, the mercury level falls, reestablishing the impingement of the beam of light on the photodiode and closing contacts RLK to operate the counter for indicating one additional count.

Figure 4:
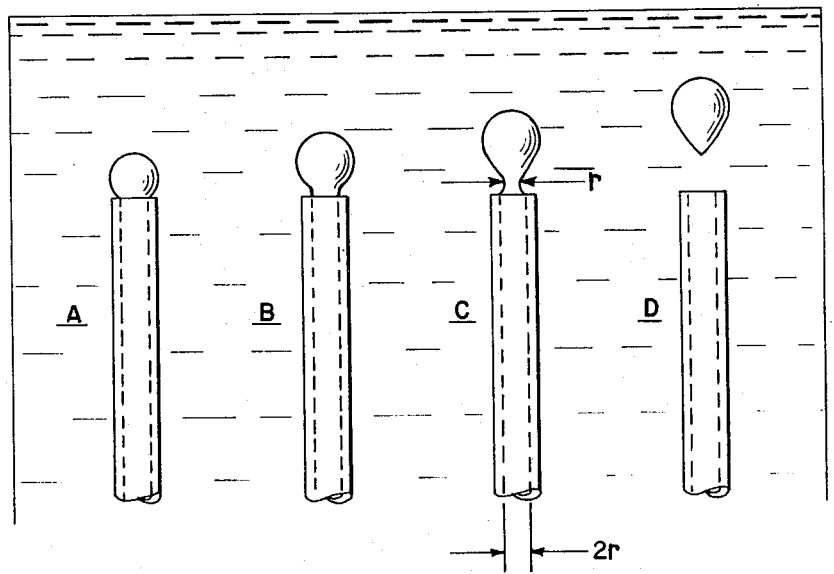
FIGS. 4A–D illustrate the stages of droplet formation.

FIGS. 4A–D illustrate the manner in which droplets of a liquid are formed at a tip of a small diameter tube extending upwardly into a liquid having a higher specific gravity than that of the droplet, showing the four primary stages of droplet development as follows: (A) initial droplet formation, (B) elongation of the base, (C) necking down of the base, and (D) separation from the tube. The input liquid may be assumed to be water and the immersion fluid may be assumed to be mercury, but it will be understood that the following analysis is generally valid for an immersion liquid having a higher specific gravity than the input liquid (assuming that there is no chemical reaction between the liquids). In FIG. 4A, the droplet is shown beginning to form on the tip of the tube as water is forced through the tube. The droplet is retained on the tube by the surface tension forces of the water molecules tending to cohere to each other and the adhesion of the water to the tube. As the droplet forms, it displaces an equal volume of mercury, and since the specific gravity of mercury is greater than that of water, a buoyant force tends to pull the droplet from the tube. Recognizing that a droplet will be retained on the tube until the buoyant forces exceed the surface tension forces, and that the buoyant force depends on the volume of mercury displaced, it is possible to analytically predict the critical volume of the droplet required to effect separation of the droplet from the tube using the following equation:

$$F_s = F_b$$

where $F_s$ equals the surface tension force retaining the droplet on the tube, and $F_b$ equals the buoyant force tending to separate the droplet from the tube. Assuming that the droplets formed in the mercury are of a generally spherical shape, $F_b$ and $F_s$ may be expressed by the following equation:

$$F_s = 2\pi r T$$

where $r$ is the critical diameter of the necked down base prior to separation of the droplet from the tube as shown in FIG. 4C, and $T$ is a constant representing the interfacial surface tension. For small diameter tubes, $r$ may be assumed to equal the inside radius of the tube, and $$F_b = V(\rho_1 = \rho_2)g$$

where $V$ is the critical volume of the droplet, $\rho_1$ is the density of the input liquid, $\rho_2$ is the density of the immersion liquid, and $g$ is a gravitational constant. Setting $F_s = F_b$ we see that $$2\pi r T = V(\rho_1 - \rho_2)g$$

or $$V = 2\pi r T/(\rho_1 - \rho_2)g$$

Thus it can be seen that for two given liquids, the theoretical critical volume of the droplets depends only on the inside radius of the droplet-forming tube. Using a droplet-forming tube having a 0.5 millimeter diameter orifice, the calculated theoretical volume of a droplet of water formed in mercury is 0.00475 cubic centimeters. The average critical volume of droplets as determined in experimental tests tends to be slightly smaller (0.0037 cubic centimeters) than the theoretical results. This variance can be accounted for by impurities in the liquids, temperature differences, edge effects of the tubes, and errors in the assumption that the critical diameter $r$ is equal to the radius of the tube. The height of the mercury column above the tip of the tube has not been found to be critical so long as the tip is covered by at least 2 millimeters of mercury and so long as the height of the mercury is not sufficient to overcome the cohesive surface tension characteristics of the mercury so as to force mercury down into the tube.

In use, a flow meter of this invention is oriented in a vertical position as it is shown in FIG. 1, and the flow measuring path 5 and by-pass passage 29 primed with input liquid L. Sensing head 65 is vertically adjusted by means of adjusting screw 67 so that the light beam 71 tangentially contacts the topmost surface of meniscus 63 of the mercury when no droplets of input liquid are within the mercury. The valve 31 is moved to the left (as shown in FIG. 1) to permit input liquid to flow at a relatively low rate into flow measuring path 5, and through tube 7, with formation of droplets at the tip of the tube in the mercury. As each droplet forms within the mercury, an equal volume of mercury is displaced causing meniscus 63 to rise within transparent tube 45 and to interrupt light beam 71 and thereby open relay contacts RLK. When the volume of the droplet reaches its above described critical volume, the buoyant force causes the droplet to separate from the tube 7 and to rise within the mercury. As the droplet passes through the meniscus and merges with the liquid L thereabove, the level of the mercury column drops within the transparent tube permitting the light beam to once again register with the photodiode 77, which in turn causes relay contacts RLK to close, thus actuating the counting device. The flow rate of the input liquid is readily determined by totaling the number of droplets detected within a known period of time and by determining the average critical volume of each droplet.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A liquid flow meter comprising a body having a passage for flow of liquid therethrough, means in said passage for causing the flow to occur upwardly in droplets, a volume of mercury in the passage above said droplet-forming means, said droplet-forming means being restricted so as to hold the mercury thereabove in the passage and being adapted to break up the flow of liquid through the passage into droplets in the mercury with accompanying rise in the level of the mercury on formation of each droplet, and fall of the level of the mercury on passage of each droplet up and out of the mercury on and means operable by the mercury in response to change in its level for counting each droplet.

2. A liquid flow meter as set forth in claim 1 wherein said passage has an inlet and an outlet and a vertical reach between the inlet and the outlet, and said droplet-forming means comprises an upwardly extending tube in said vertical reach, said tube being in communication with the inlet and being submerged under said mercury.

3. A liquid flow meter as set forth in claim 2 having a by-pass around said passage, and valve means for directing flow through said passage, or through said by-pass, or cutting off the flow.

4. A liquid flow meter as set forth in claim 2 wherein said counting means is operable in response to rise of the level of the mercury in said vertical reach of the passage caused by formation of a droplet at the upper end of the tube.

5. A liquid flow meter as set forth in claim 4 wherein said vertical reach of said passage is constituted by a transparent tube, and said counting means comprises means for directing a beam of light through the transparent tube from one side thereof to the other immediately above the level of the mercury, and a photoelectric cell positioned to receive said beam, said beam being interrupted on rise of the level of the mercury caused by formation of a droplet at the upper end of the droplet-forming tube.

6. A liquid flow meter as set forth in claim 5 wherein said light beam means and said cell are carried by a member adjustable vertically with respect to said transparent tube.

7. A liquid flow meter as set forth in claim 5 wherein said meter comprises a base having a recess on the top thereof and a head above the base, a tubular fitting having a lower end portion received in said recess, a smaller diameter intermediate portion extending upwardly from said lower end portion with an annular shoulder around the lower end of said intermediate portion, said tube extending upwardly from the upper end of said intermediate portion, said transparent tube having its lower end fitting around said intermediate portion of said fitting and its upper end received in a recess in said head.

* * * * *